G. BARKER.
VARIABLE SPEED FRICTION GEAR.
APPLICATION FILED JULY 3, 1919.
1,372,638.
Patented Mar. 22, 1921.
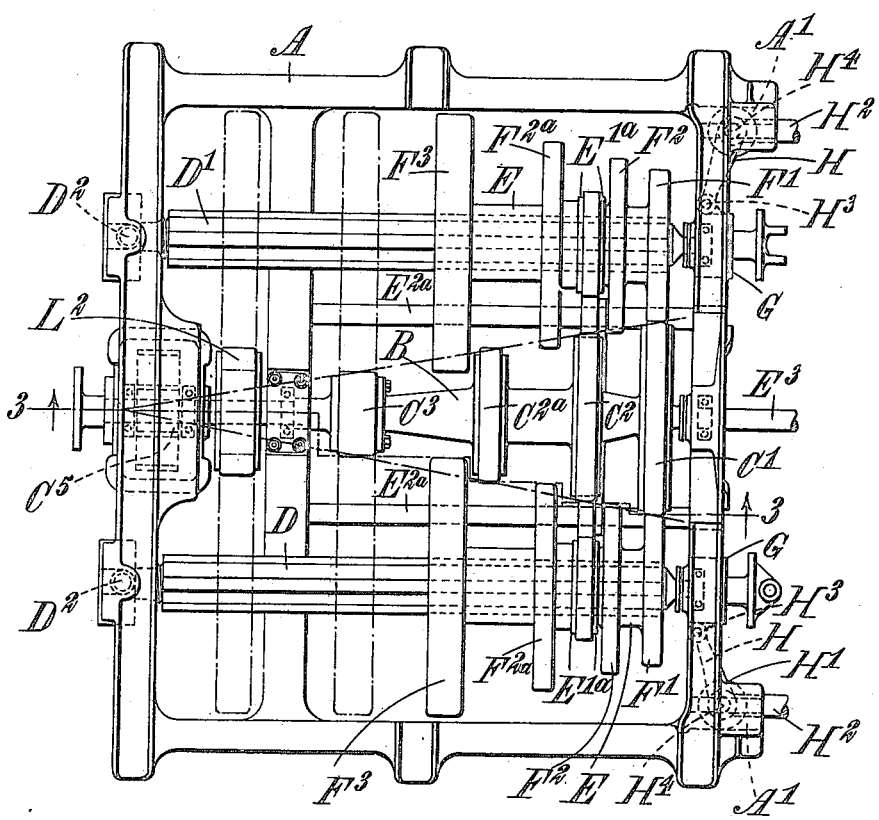
Fig. 1.
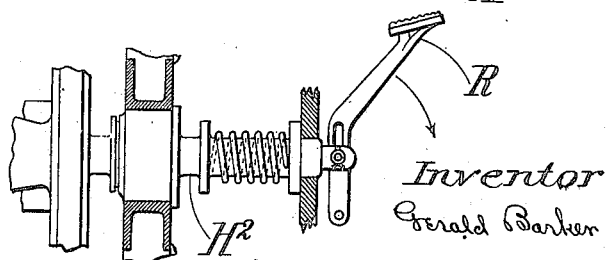
Fig. 1.ᵃ
Inventor
Gerald Barker

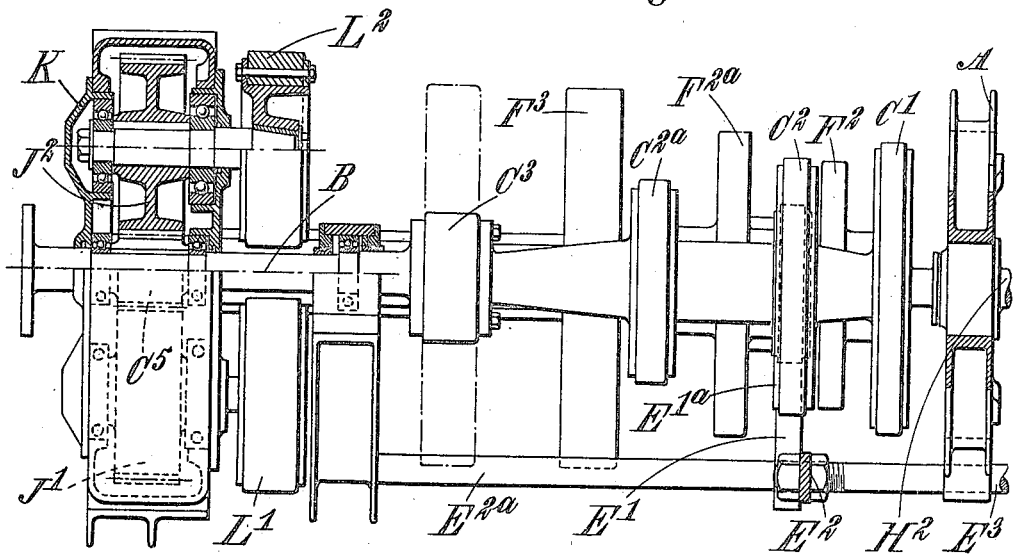
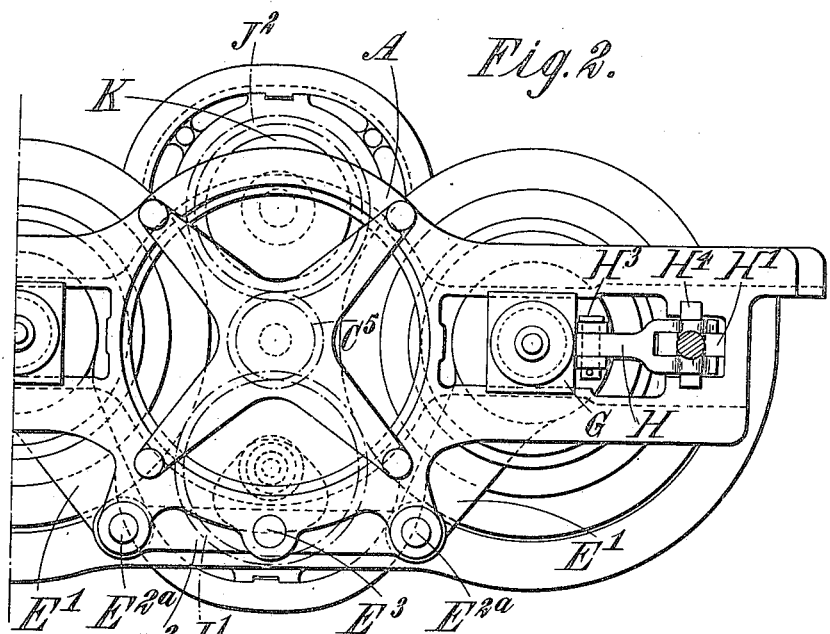

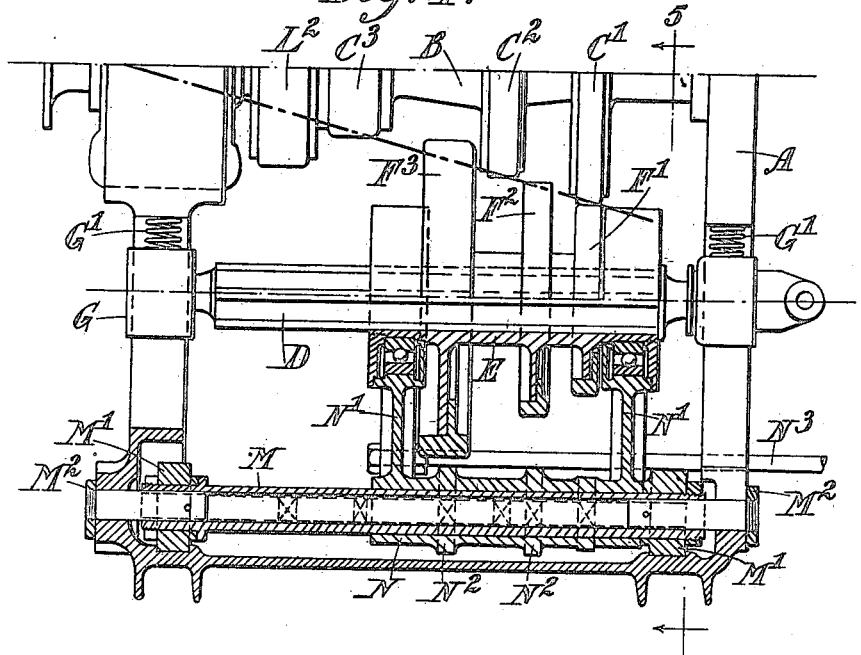
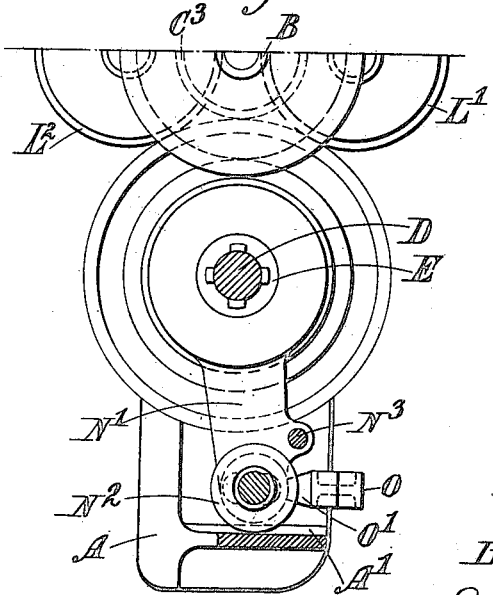

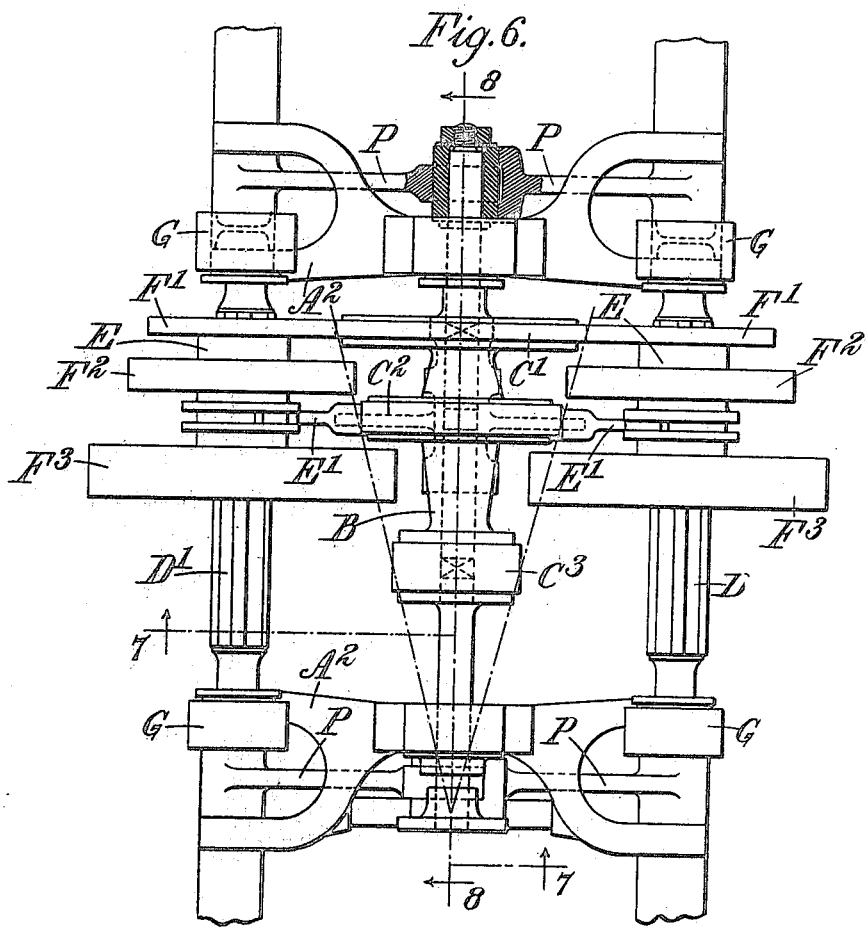

UNITED STATES PATENT OFFICE.

GERALD BARKER, OF LONDON, ENGLAND.

VARIABLE-SPEED FRICTION-GEAR.

1,372,638.

Specification of Letters Patent.   Patented Mar. 22, 1921.

Application filed July 3, 1919. Serial No. 308,630.

*To all whom it may concern:*

Be it known that I, GERALD BARKER, a subject of the King of England, residing in London, England, have invented certain new and useful Improvements in Variable-Speed Friction-Gears, of which the following is a specification.

This invention relates to variable-speed friction-gear of the type comprising a set of driving friction-wheels mounted on a driving shaft, a set of driven friction-wheels adapted to be driven each by one of the driving friction-wheels, means for sliding the wheels of the one set in relation to the wheels of the other for bringing a desired pair of friction wheels into operative engagement, and a lever for thrusting the one wheel of an engaged pair against the other.

The invention has for its object to provide that the lateral thrust normally applied to one of the shafts to force the wheels into working engagement can be made to vary in the correct ratio to the speeds, the lightest pressure being employed for top speed and the maximum pressure for the lowest speed.

A variable-speed friction-gear of the type described according to the invention is characterized by the wheels on one shaft being so graded as to size that corresponding parts of the peripheries of all the wheels of the one set, when each is in its engaging position, coincide with the surface of a cone which is concentric with the axis of the shaft and has its apex situated at a point somewhere beyond the smallest wheel, and by the lever for applying the lateral thrust being disposed parallel to the said shaft and being fulcrumed with such a position in relation to the apex of the said cone (for example at a point which lies in the same transverse plane as the apex of the cone) and operatively connected with the other set of wheels in such a manner that the pressure of the lever is always applied in direct line with the pair of engaging wheels and is greatest on the pair of slow-speed wheels which are nearest the fulcrum of the lever.

Conveniently, the shaft whereon is slidably mounted the set of wheels which coöperates with the wheels whose peripheries coincide with a cone, is itself mounted to swing bodily about a pivot at one end, and means for swinging the shaft are connected to that end which is nearest the base of said cone, so that the shaft thus constitutes the thrust-applying lever.

In one construction of variable-speed friction-gearing according to the invention, the shaft carrying the set of wheels which is movable into operative engagement with other set of wheels is mounted to have only a movement parallel to itself, and an intermediate thrust-piece is provided which slides with the wheels and has mechanical contact with the thrust-applying lever only at that point which is in line with the pair of wheels which are in operative engagement at any one moment.

Preferably, for the purpose of obtaining the selective point of thrust the intermediate thrust-piece has projections which correspond in position to the wheels of the slidable set of wheels, and the operating lever has coöperating projections which correspond in position to the wheels of the other set, so that when any one pair of wheels is in operative engagement the corresponding pair of projections will be in alinement therewith.

Other features of the invention will be described hereinafter.

One embodiment of the invention and modifications thereof are illustrated by way of example in the accompanying drawings, wherein:—

Figure 1 is a top plan view;

Fig. 1ª is a diagrammatic partial view in elevation showing the controlling-pedal for the gear;

Fig. 2 is a partial end elevation, and

Fig. 3 is a vertical transverse section taken on the bent line 3—3 in Fig. 1, showing one form of variable-speed friction-gear according to the invention;

Fig. 4 is a top plan view, partly in horizontal section, and

Fig. 5 is a transverse section taken on the line 5—5 in Fig. 4 showing one half of a modified form of friction-gear;

Figure 7:
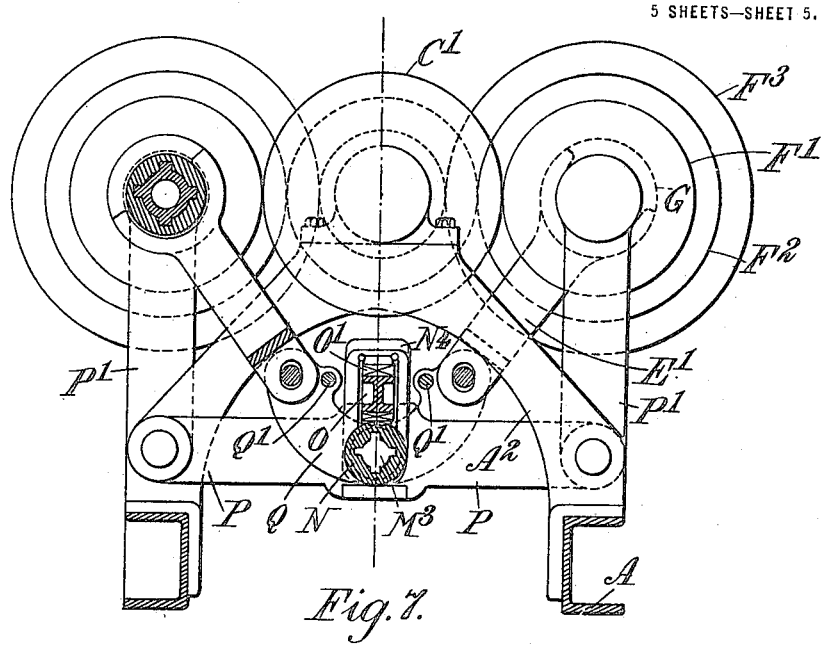
Figure 8:
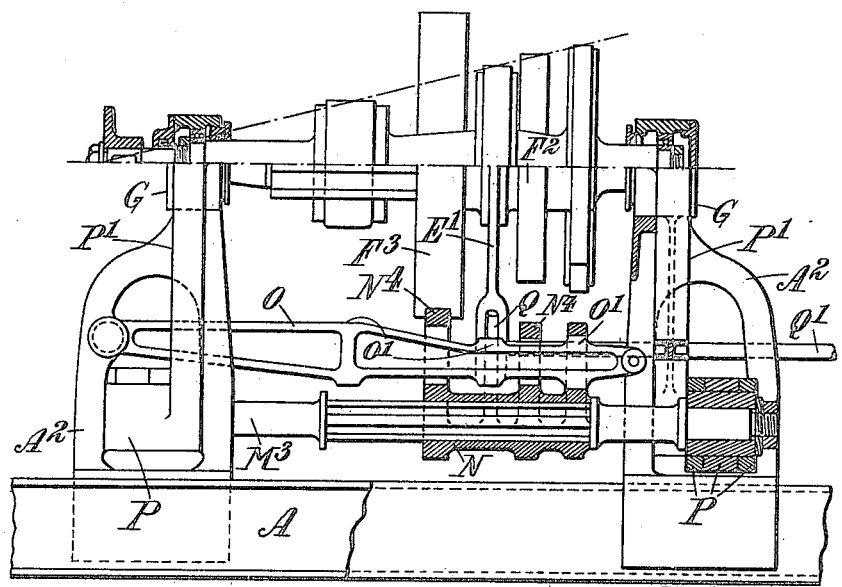

Figs. 6, 7 and 8 are respectively top plan views partly in section, end elevation partly in section taken on the line 7—7 in Fig. 6, and side elevation partly in section taken on the line 8—8 in Fig. 6, showing another modified construction of friction-gear.

Like reference letters designate like parts in all the views.

Referring first to Figs. 1 to 3, a frame A has journaled in it a driving shaft B which has fast upon it four driving friction-wheels $C^1$, $C^2$, $C^{2a}$, $C^3$; these wheels are in the form of disks whose edges constitute the driving faces which are parallel with the axis of rotation of the shaft B. The driving wheels are graded in size and so arranged that the smallest lies near one end of the shaft and the largest at the other end, and they are so spaced apart that corresponding parts of their peripheries coincide with the surface of a cone, whereof the largest wheel forms the base and whereof the apex is situated beyond the smallest wheel and coincides with the axis of rotation of the shaft. It will be seen that the driving faces, as a whole, do not coincide with the surface of this cone, as in that case they could not be parallel with the axis of rotation of the shaft, but the center of each driving face coincides with the said surface.

Mounted in the frame A on opposite sides of the driving shaft B are two driven shafts D, $D^1$, which can be connected in any convenient manner to the mechanism to be driven, for example by means of forked ends. On each of these shafts D, $D^1$ is mounted a sleeve E which carries a set of driven friction-wheels $F^1$, $F^2$, $F^{2a}$, $F^3$ for coöperation with the friction-wheels on the driving-shaft. Each sleeve E is slidably splined on its shaft and is embraced by a double thrust-bearing $E^{1a}$ rotatably carrying an arm $E^1$ pivotally connected to a bar $E^2$ which can be moved backward and forward along guide-rods $E^{2a}$ by means of an operating rod $E^3$. By operating the rod $E^3$ each set of driven friction-wheels can be slid along its shaft and each individual driven friction-wheel can be brought into alinement with its allotted driving friction-wheel.

In this arrangement, wear on the friction wheels may be taken up by adjusting the positions of the pivots $D^2$, hereinafter mentioned, by means of screws or thin, e. g. pen steel, packings, so that the driven shafts, when the lower-speed friction-wheels are in engagement, may be approximately parallel with the driving shaft and so minimize the loads on the said thrust bearings.

The ends of the driven shafts D, $D^1$ which are situated beyond the smallest wheel $C^3$ on the driving-shaft rotate each in a bearing and swing about vertical pivots at $D^2$ mounted in the frame A. The fulcrums of both the shafts D, $D^1$ are located in a plane which is transverse to the axis of rotation of the driving-shaft and passes through the point of the apex of the aforesaid cone. The other ends of the driven shafts D, $D^1$ are journaled each in an axle-box G which is slidable in the frame A and is normally pressed inward toward the driving-shaft B by a toggle H actuated through its operating rod $H^2$, by one or more conveniently arranged compression springs not shown in the drawing. Each toggle is pivoted to its allotted axle-box G by a pivot-pin $H^3$, and each fulcrum-roller $H^1$ of the toggles is arranged to run on a face $A^1$ machined on the frame A, the pivot-pin $H^4$ of each roller $H^1$ being guided in slots cut in the frame. When the said compression-spring or springs actuate the toggles by means of the rods $H^2$ to move the axle-boxes, those ends of the shafts D, $D^1$ which are nearest the base of the said cone are pressed toward one another, so that each driven wheel in alinement with its allotted driving wheel is thrust against the latter for the purpose of assuring operative frictional engagement. By means of a pedal-lever, for example K, each toggle-operating rod $H^2$ may be actuated in the opposite direction against its spring, so that those ends of the shafts D, $D^1$ which are nearer the base of the same cone, are positively drawn apart.

It will be seen that the described friction-gear enables any one of four speeds to be obtained, and that the leverage operative on the various pairs of engaged wheels will increase as the lower speeds are brought into action, because the wheel brought into operation for each lower speed is nearer the fulcrum of the shaft carrying it. This is what is required to obtain an ideal drive in which, without the pressure being excessive in any one case, sufficient pressure can be obtained throughout the entire range of speeds.

Any convenient reversing gear may be combined with the described friction-gear. As shown in Figs. 2 and 3 in this embodiment of the invention, the reversing gear comprises a fifth driving-wheel $C^5$ in the form of a toothed pinion keyed on the driving shaft B at a point between the friction wheel $C^3$ and the apex of the above-mentioned cone. Meshing with the pinion $C^5$ are two larger toothed gear-wheels $J^1$, $J^2$ which are journaled in the gear-box K mounted in the frame A. Each of these gear-wheels $J^1$, $J^2$ drives a friction-wheel $L^1$, $L^2$, mounted respectively on the same shafts as the gear-wheels $J^1$, $J^2$ and arranged to be frictionally engaged by the largest driven friction wheels $F^3$ when the sleeves E have been shifted far enough along their shafts in the direction of the reversing gear.

In some cases it may be preferable to arrange for the side shafts D, $D^1$ to move parallel to themselves instead of mounting them to rock as described above. Such an arrangement wherein the same increase of thrust on the engaged friction-wheels for the lower speeds can be obtained will now be described.

In the construction of friction-gear shown in Figs. 4 and 5, both ends of the driven shaft D are journaled in axle-boxes G mounted to slide in the frame A against the action of springs $G^1$. A hollow thrust-shaft M has its ends slidable in slots in the ends of the frame and is arranged to run on rollers $M^1$ on the side member of the frame. Nuts $M^2$ screwed on the extremities of the thrust-shaft prevent any undue axial movement. Slidable along this thrust-shaft is a sleeve-like body of a yoke N having two arms $N^1$, the outer ends of which are annular and embrace the two ends of the slidable sleeve E carrying the driven friction-wheels. The body of the yoke N constitutes an intermediate thrust-piece and has projections $N^2$ in the form of flanges, whereof one lies opposite each friction-wheel $F^1$, $F^2$, $F^3$. A vertically-swinging operating lever O disposed parallel with the thrust-shaft M and fulcrumed in the frame A in the transverse plane containing the point of the apex of the above-mentioned cone is provided with projections $O^1$ which are situated one opposite each of the driving friction-wheels $C^1$, $C^2$, $C^3$ and $L^2$. The yoke N can be slid to and fro by its operating rod $N^3$. When any two friction-wheels are in engagement, the projection $N^2$ on the yoke which corresponds to that speed is located in alinement with that projection $O^1$ on the lever which is opposite the driving-wheel engaged; on the lever O being actuated a toggle action of the rollers $M^1$ and arms $N^1$ comes into play and a direct thrust is imparted through the operative projection $O^1$ and the corresponding projection $N^2$ on the yoke to the shaft D. The pressure is distributed between the two arms $N^1$ in inverse proportion to their distances from the particular projection $N^2$ which is operative, and these two components are combined in their effect on the shaft D to give a pressure in direct line with the pair of engaged wheels equal to the pressure exerted by the toggle mechanism. It will thus be seen that in this construction in which the thrust of the lever O is applied to the yoke in a plane not containing the axes of rotation of the shafts B and D, the degree of leverage also increases as the lower speeds are brought into operation.

In the modified construction of friction-gear shown in Figs. 6, 7 and 8, the driving-shaft B is journaled in the upper part of the end-members $A^2$ of the frame A. Four unitary or adjustable sectional bell-crank levers P, P are fulcrumed in the ends of the frame, one in the lower side portions of each member $A^2$. One driven shaft D is journaled in axle-boxes G mounted on the upper ends of the vertical arms $P^1$ of two of these levers situated at opposite ends of the frame, and the other driven shaft $D^1$ is similarly mounted parallel with the driving shaft B at the other side of the frame.

Carried by the inner ends of the horizontal arms P of the bell-crank levers vertically below the driving-shaft B is a thrust-shaft $M^3$ whereon the sleeve-like thrust-member N having projections $N^4$ is slidably splined. As in the form of friction-gear described above with reference to Figs. 4 and 5, these projections $N^4$ correspond in position to the wheels $F^1$, $F^2$, $F^3$ on the two driven-shafts, but in this construction they are slotted to form loops, and are thus double-acting; extending through them is the lever O. This lever has projections $O^1$ arranged as described above but provided on both its upper and lower sides and adapted to impart a thrust either upwardly or downwardly to the loop $N^4$ with which it is in engagement for the time being. In order to slide the sleeve N along the thrust-shaft $M^3$, the sleeve carries a cross-bar Q having two upwardly-curved arms, one on each side, the outer ends of which are pivotally connected to the lower free ends of arms $E^1$ which embrace the sleeve E as described above with reference to Figs. 1 to 3. Two rods $Q^1$ for shifting the sleeve N and, consequently, the sleeves E and the wheels $F^1$, $F^2$, $F^3$ are secured at one end to the cross-bar Q and are connected together at their other ends by a second cross-bar, not shown, to which is attached an operating rod connected with the change-speed lever for actuating the friction-gear.

It will be understood from the above that by moving the cross-bar Q to and fro in the longitudinal direction of the thrust-shaft $M^3$, any desired pair of friction-wheels can be brought into operative engagement and that when so engaged, the double projection $O^1$ on the lever O in alinement with the engaged pair of wheels can impart the thrust of the lever O either downwardly to that loop $N^4$ which is in alinement with the pair of engaged wheels to tend to rock the levers P, $P^1$ so as to cause the pair of engaged wheels to be held in operative engagement, or upwardly to rock the lever-arms $P^1$ at opposite sides of the frame outwardly and thus move the said pair of wheels out of engagement. The thrust of the lever O is thus imparted directly to the bearings of the driven shafts.

It will be seen that in this construction also the distance of the point of application of the thrust of the lever O from the fulcrum of the lever varies with the different speeds which are thrown into gear, and that the pressure increases on each successive lower gear.

Conveniently the wheels on the driving shaft are of fiber or some non-metallic material, and the coöperating wheels may be of metal.

It will be apparent that an interchange of parts may be made in the different embodiments of my invention and that the various details of construction thereof may be changed as required without departing from the spirit of the invention as defined in the appended claims.

What I claim as my invention and desire to secure by Letters Patent is:—

1. In a variable-speed friction gear, the combination with a driving shaft, of a plurality of driving friction-wheels of different diameters mounted thereon and so spaced longitudinally that corresponding parts of all the wheels lie in a common conical surface, a driven shaft, a plurality of driven friction-wheels thereon allocated one to each driving friction-wheel, means for selectively engaging any driven friction-wheel with its coöperating driving wheel to transmit power to the driven shaft, and means for applying to a pair of friction-wheels when engaged with one another, a lateral pressure which is greater or smaller according as the diameter of the driving wheel is smaller or greater.

2. In a variable-speed friction-gear the combination with a driving shaft, of a plurality of driving friction-wheels of different diameters mounted thereon and disposed with corresponding parts of all the wheels lying in a common conical surface, a driven shaft, a plurality of driven friction-wheels thereon allocated one to each driving friction-wheel, means for selectively engaging any driven friction-wheel with its coöperating driving wheel to transmit power to the driven shaft, a lever fulcrumed at one end, means for applying pressure on the lever at its other end, and means operatively connecting a pair of friction-wheels when in engagement with one another with the lever at a point more or less remote from its fulcrum according as the diameter of the driving wheel is greater or smaller.

3. In a variable-speed friction-gear the combination with a driving shaft, of a plurality of driving friction-wheels of different diameters mounted thereon and disposed with corresponding parts of all the wheels lying in a common conical surface, a driven shaft, a plurality of driven friction-wheels thereon allocated one to each driving friction-wheel, means for selectively engaging any driven friction-wheel with its coöperating driving wheel to transmit power to the driven shaft, a lever disposed parallel with the driving-shaft opposite the driving friction wheels thereon and extending longitudinally beyond the transverse plane of the smallest of said friction-wheels, a fulcrum on said extended portion, means for applying pressure to the lever at the end remote from its fulcrum, and means operatively connecting a pair of friction-wheels when in engagement with one another with the lever at a point more or less remote from its fulcrum, according as the driving friction-wheel which is in engagement is more or less remote from the transverse plane containing the fulcrum of said lever.

4. In a variable-speed friction-gear the combination with a driving shaft, of a plurality of driving friction-wheels of different diameters mounted thereon and disposed with corresponding parts of all the wheels lying in a common conical surface, a driven shaft, a plurality of driven friction-wheels thereon allocated one to each driving friction-wheel, means for selectively engaging any driven friction-wheel with its coöperating driving wheel to transmit power to the driven shaft, a lever disposed parallel with the driving shaft, and fulcrumed at a point lying near the plane transverse to the driving shaft which contains the apex of the said conical surface, and means operatively connecting a pair of friction wheels when in engagement with one another with the lever at a point more or less remote from the fulcrum of the lever according as the diameter of the driving wheel is greater or smaller.

5. In a variable-speed friction-gear the combination with a driving shaft, of a plurality of driving friction-wheels of different diameters mounted thereon and disposed with corresponding parts of all the wheels lying in a common conical surface, a driven shaft, a plurality of driven friction-wheels thereon allocated one to each driving friction-wheel, means for selectively engaging any driven friction-wheel with its coöperating driving wheel to transmit power to the driven shaft, a lever disposed parallel with the driving shaft opposite the friction-wheels thereon and extending longitudinally beyond the plane containing the smallest driving friction-wheel, a fulcrum on said extended portion of the lever, means for applying pressure to the other end of the lever, and an operative connection between the lever and a pair of friction-wheels in engagement with one another whereby lateral pressure is transmitted to said pair of wheels from a point on the lever which point is in the plane transverse to the driving-shaft and containing the said pair of wheels.

6. In a variable-speed friction-gear, the combination with a driving shaft, of a plurality of driving friction-wheels of different diameters mounted thereon and disposed with corresponding parts of all the wheels lying in a common conical surface, a driven shaft, a plurality of driven friction-wheels thereon allocated one to each driving friction-wheel, means for selectively engaging any driven friction-wheel with its coöperating driving wheel to transmit power to the driven shaft, a lever disposed parallel with the driving-shaft opposite the friction-wheels thereon and fulcrumed at a point lying substantially in that plane transverse to the driving shaft which contains the apex of the said conical surface, means for applying pressure to the other end of the lever, and an operative connection between the lever and a pair of friction-wheels in engagement with one another whereby lateral pressure is transmitted to said pair of wheels from the lever at a point thereon in the plane of the said pair of wheels.

7. In a variable-speed friction-gear the combination with a driving shaft, of a plurality of driving friction-wheels of different diameters mounted thereon and disposed with corresponding parts of all the wheels lying in a common conical surface, a rotatable driven shaft, disposed normally parallel with the driving shaft, a plurality of driven friction-wheels mounted on the said driven shaft and allocated one to each of said driving friction wheels, means for selectively engaging any driven friction-wheel with its coöperating driving friction-wheel to transmit power to the driving shaft and a toggle mechanism operative on said driven friction wheels when a pair of coöperating friction-wheels are in engagement with one another.

8. In a variable-speed friction-gear the combination with a driving shaft, of a plurality of friction-wheels of different diameters mounted thereon and disposed with corresponding parts of all the wheels lying in a common conical surface, a splined rotatable driven shaft normally parallel with said driving shaft, a sleeve rotatively locked on said splined shaft but slidable therealong, a plurality of friction-wheels on said sleeve so spaced as to be capable of selective engagement each with one of said driving friction-wheels, means for moving said sleeve longitudinally of said splined shaft, toggle mechanism operative for insuring driving engagement between coöperating friction wheels, resilient means normally tending to operate said toggle mechanism, and means whereby said resilient means can be temporarily rendered inoperative.

9. In a variable-speed friction-gear, a driving shaft, a driven shaft substantially parallel thereto, a plurality of friction gears of different diameters on each of said shafts, means for selectively engaging said gears, and means for applying a lateral pressure to a pair of engaging gears, which pressure increases as the diameter of the engaging gear on the driven shaft increases.

10. In a variable-speed friction gear, a relatively fixed driving shaft, a relatively movable driven shaft substantially parallel thereto, a plurality of friction gears of different diameters on each of said shafts, means for selectively engaging said gears, and means for supplying a lateral pressure to said movable shaft to insure driving engagement between the pair of engaging gears, which pressure increases as the diameter of the engaging gear on the driven shaft increases.

11. In a variable-speed friction-gear, a driving shaft, a driven shaft substantially parallel thereto, a plurality of friction gears of different diameters on each of said shafts, the friction gears on said driving shaft having corresponding portions of their surfaces lying in a common conical surface, means for selectively engaging said gears, and means for applying a lateral pressure to a pair of engaging gears, which pressure increases as the pair of gears in engagement approaches the apex of said conical surface.

12. In a variable-speed friction-gear, a driving shaft, a driven shaft substantially parallel thereto, a plurality of friction gears of different diameters on each of said shafts, means for selectively engaging said gears, and a toggle mechanism for applying a lateral pressure to a pair of engaging gears, which pressure increases as the diameter of the engaging gear on the driven shaft increases.

13. In a variable-speed friction gear, a driving shaft, a driven shaft substantially parallel thereto, a plurality of friction gears of different diameters on each of said shafts, means for selectively engaging said gears and means for applying a lateral pressure to a pair of engaging gears in the plane of said gears, which pressure increases as the diameter of the engaging gear on the driven shaft increases.

14. In a variable-speed friction gear, a driving shaft, a driven shaft substantially parallel thereto, a plurality of friction gears of different diameters on each of said shafts, the friction gears on said driving shaft having corresponding portions of their surfaces for selectively engaging said gears, and a pivot lever for applying a lateral pressure to a pair of engaging gears, said lever being pivoted in a plane transverse to said conical surface and extending at least to the apex thereof so as not to intersect said surface.

In testimony whereof I affix my signature.

GERALD BARKER.